Figure 1:
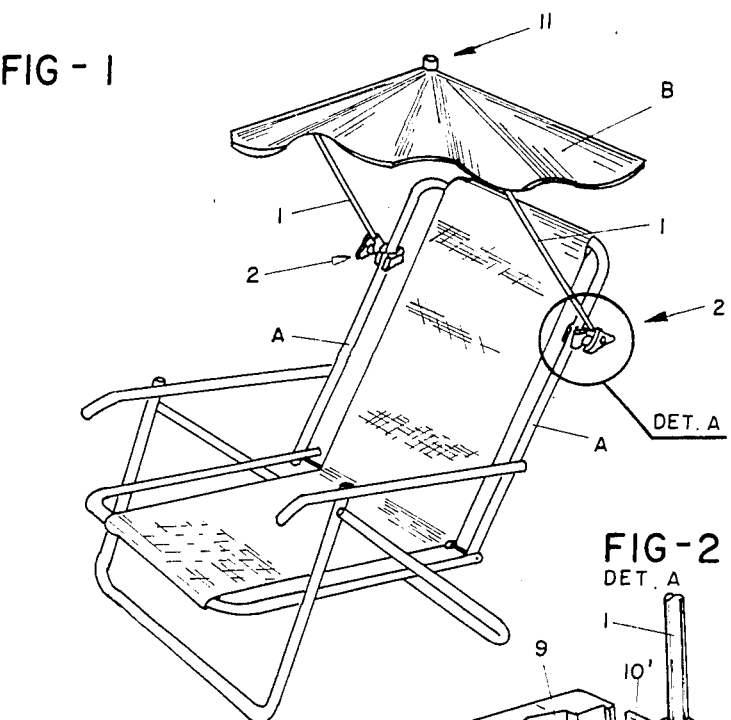

United States Patent [19]

Fuser

[11] Patent Number: 4,809,724
[45] Date of Patent: Mar. 7, 1989

[54] SUNSHADE-HOLDER FOR DECK CHAIRS AND BABY CARRIAGES

[76] Inventor: Anacleto Fuser, Rua Brasilio Machado, 270, apt. 112, 01230 Sao Paulo, Brazil

[21] Appl. No.: 172,062

[22] Filed: Mar. 23, 1988

[30] Foreign Application Priority Data

Mar. 24, 1987 [BR] Brazil .................. 6700472[U]

[51] Int. Cl.$^4$ ............................................. A45B 3/00
[52] U.S. Cl. .................................. 135/16; 248/514; 297/184; 297/217
[58] Field of Search ............ 135/16, 96; 297/184, 297/217; 248/514, 534, 535

[56] References Cited

U.S. PATENT DOCUMENTS

| | | | |
|---|---|---|---|
| 2,726,668 | 12/1955 | Levine | 135/16 |
| 3,050,280 | 8/1962 | Regan | 135/96 X |
| 3,407,825 | 10/1968 | Doyle | 135/16 X |
| 3,765,434 | 10/1973 | Riggs | 135/16 X |
| 3,879,086 | 4/1975 | Moceri | 297/184 |

FOREIGN PATENT DOCUMENTS 206772 12/1959 Austria ..................... 135/96

Primary Examiner—J. Karl Bell
Attorney, Agent, or Firm—Darby & Darby

[57] ABSTRACT

A sunshade holder which has a U-shaped rod fastened to the tubular structure (A) of the deck chair or baby carriage, by means of devices (2), fastened on its free ends, while on the rod (1) a device is slidingly assembled, which fastens the sunshade, consisting of a pin (12) around which a spacer sleeve (15) is assembled, and on the latter, an assembly of parts duly secured to each other by rivet (17).

2 Claims, 4 Drawing Sheets

DET. A

DET. B

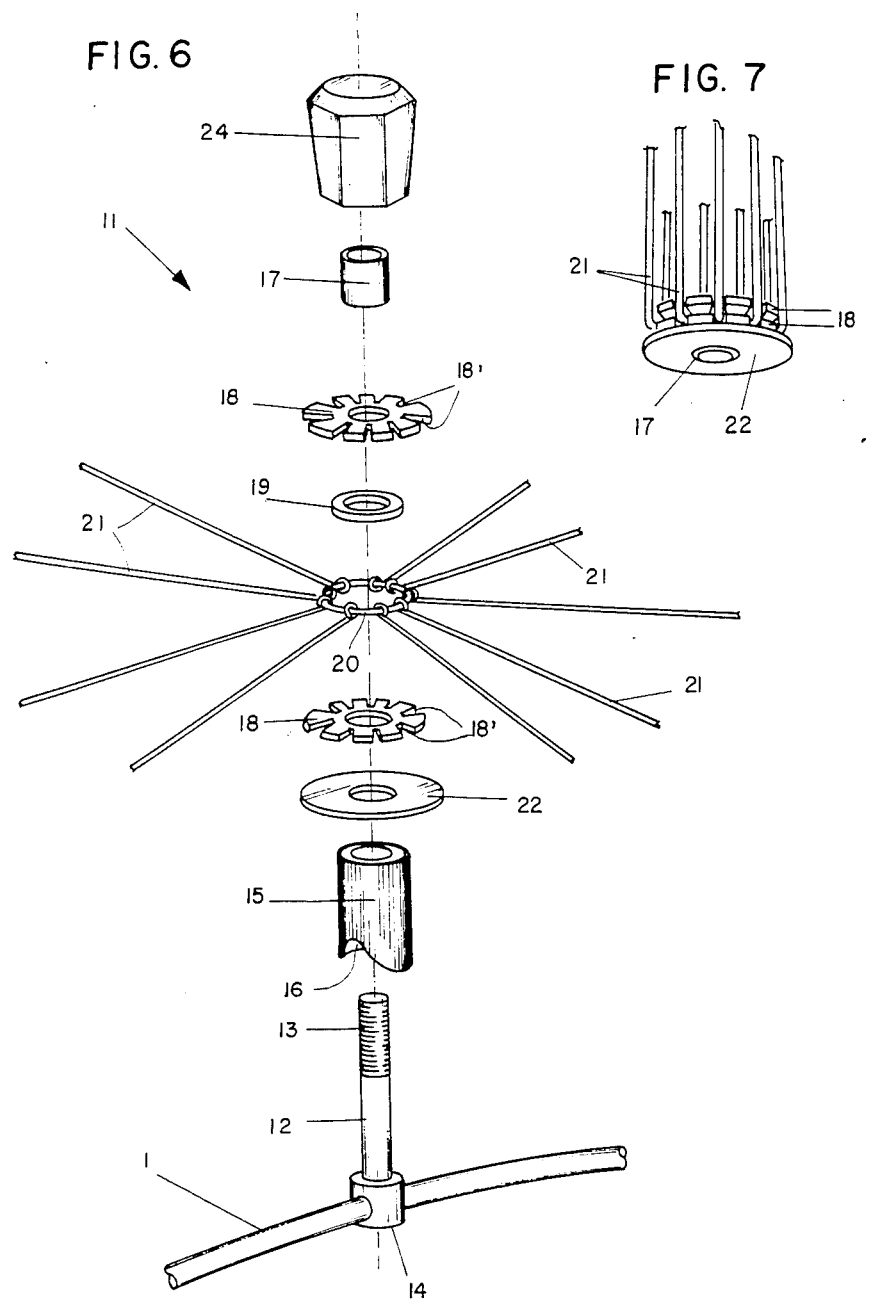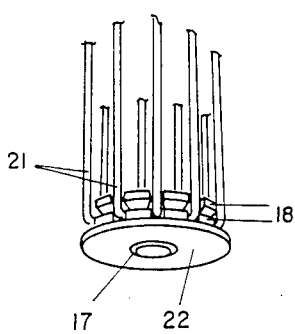

FIG. 8
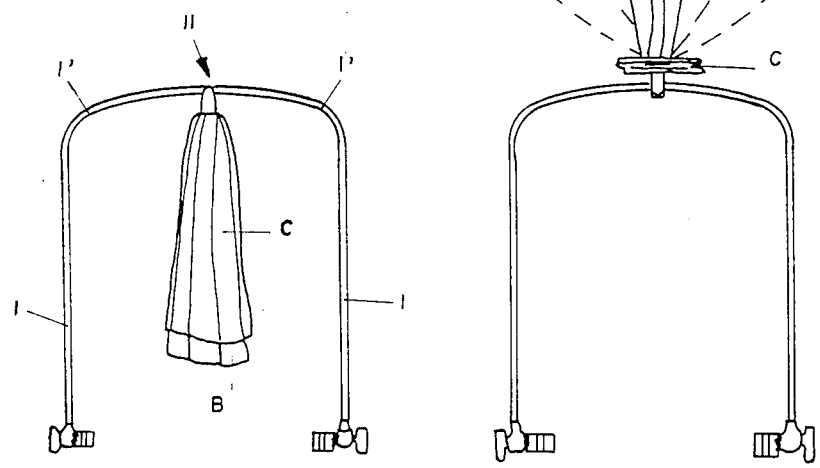
FIG. 9
FIG. 10
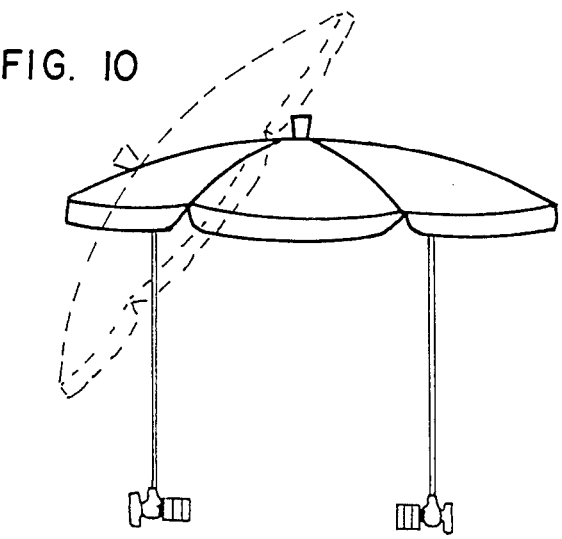

SUNSHADE-HOLDER FOR DECK CHAIRS AND BABY CARRIAGES

This Utility Model Patent refers to a sunshade-holder adaptable to deck chairs and baby carriages, consisting of a "U" shaped rod fastened to the arms of the chair or carriage, and on which the sunshade itself slides, it being possible to change, by means of adjusting devices, both the inclination of the rod in vertical direction, as well as the sunshade positioning along the rod, which permits to keep the sunshade always in a position which protects best the user or the child from sun rays, whichever the position of the sun may be.

The articulation of the sunshade stems has a entirely different constructive arrangement from the usual models, greatly simplified, consequently providing a far easier and quicker assembly.

Figure 3:
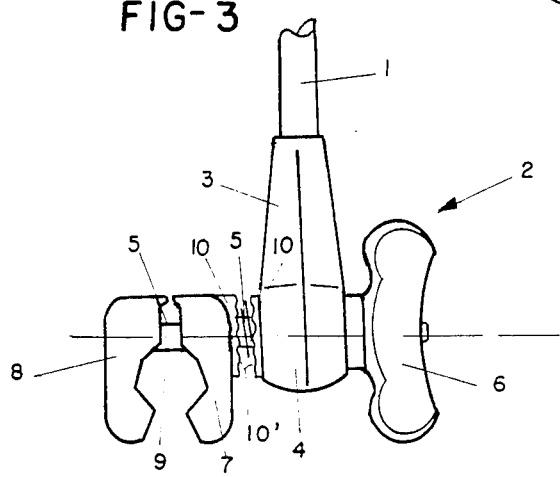
Figure 4:
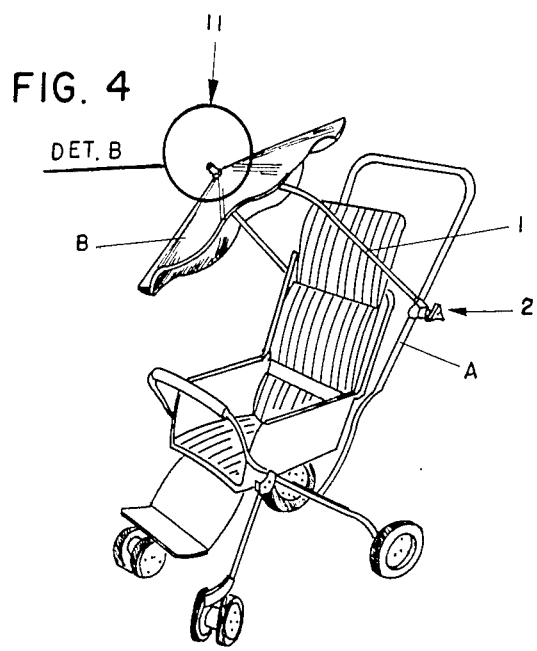
Figure 5:
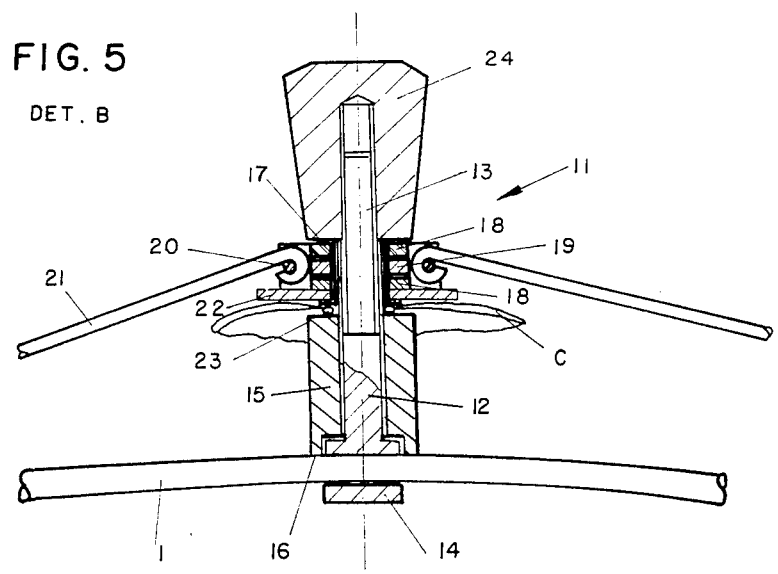

To the effect of illustration, attached hereto follow the drawings of this model, by which same will be better seen: FIG. 1 is a view of a normal deck chair, equipped with the now innovated sunshade-holder; figure two shows a detail of the former figure, illustrating one of the sunshade devices which fastens it to the structure of the chair; FIG. 3 shows the mentioned device seen from above; FIG. 4 is a view of a common baby carriage, also equipped with the now innovated sunshade-holder; FIG. 5 is a detail of the former figure, showing in cross section the device fastening the sunshade to the sunshade-holder rod; FIG. 6 is an exploded view of parts which make up the fastening device shown in the previous figure; FIG. 7 shows the parts of this assembly which are secured to each other by rivets; FIGS. 8 to 10 show in a sequence, how the sunshade opens, as well as its sliding movement on the sunshade-holder rod.

Figure 2:
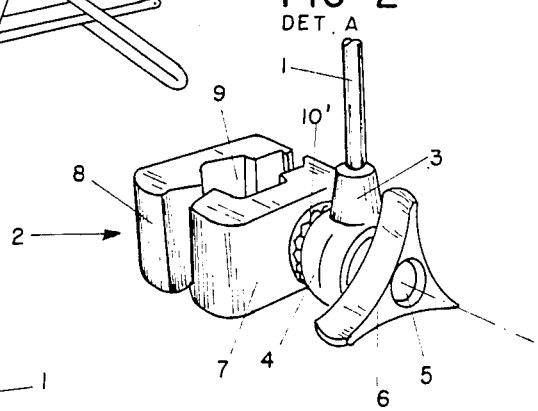

The object of this Utility Model patent is a "SUNSHADE-HOLDER FOR DECK CHAIRS AND BABY CARRIAGES" consisting of one rod (1) "U" folded, with edged (1') smoothly rounded up, rod which is fastened to the tubular structure (A) of the deck chair or the baby carriage, by means of two devices (2) fastened at their free ends, and shown in detail in FIGS. 2 and 3; said devices are made up by a central part (3), to which the free ends of the rod (1) are conveniently fastened, and which is equipped with a lower round body (4), pierced through by a horizontal pin (5), which fastens, on the one side, a crank (6) and on the other two equal and symmetrical parts (7) and (8), "C" like shaped, which limit between them a space (9) by which they are fastened to the tubular structure (A) of the chair or baby carriage; both the part (7) as the body (4) are equipped with a cylindric side protuberance (10) turned one in the direction to the other, and the confronting faces of which are equipped with teeth (10') which have the possibility to get mutually coupled.

By turning the crank (6), the two parts (7) and (8) are simultaneously being tightened, and consequently the assembly is fastened to the chair or carriage, as well as the two cylindric protuberances (10) of the part (7), of the lower body (4) are tightened, consequently obtaining the coincidence between their teeth (10'), responsible for the clamping of the rod (1) into one of the innumerous inclinations chosen by the user, in accordance with the position of the sun.

The device (11) responsible for the fixing of the sunshade and shown in detail in FIGS. 5 and 6 is slidingly mounted on the rod (1); said device consists of one pin (12), substantially long, equipped with a threaded section (13) and the cylindric head of which (14) has a through-hole, through which the rod (1) passes, whilst around the referred to pin (12) a tubular and cylindric spacer sleeve (15) is assembled, the end of which is turned towards the rod (1) and is dished (15) and capable to make pressure on the mentioned rod; an assembly of parts, duly secured to each other by rivet (17) rests on the referred to sleeve, also assembled round the pin (12), said parts being formed by two washers (18), having radial slits (18') and between them a flat ring (19) and a circular section ring (20) are foreseen, the latter supporting the stems (21) which hold the sunshade cloth (B) and which coincide with the slits (18') of the washers (18), said assembly being completed by a lower support washer (22); the washers (18), the rings (19) and (20) and the washer (22) are fastened to each other by rivet (17), as shown in FIG. 7, whilst the stems (21) which hold the cloth (B) of the sunshade are capable to be linked upwards and downwards, lodging in the slits (18') of the washers (18).

Optionally, between the sleeve (15) and the assembly of parts fastened by rivet (17), a washer (23) may be foreseen which holds a protection plastic cover (C) for the sunshade cloth, when same should be in closed position.

As an element fastening the sunshade to the rod (1), a button (24) is foreseen, screwable at the threaded section (13) of the pin (12) and the turn of which in direction to the rod (1) causes the tightening of all above mentioned components against the sleeve (15), and of the latter against the rod (1), so that its dished end (16), by making a pressure against the rod (1) fastens the assembly in the position chosen by the user.

When the button (24) is not fully screwed on the pin (12) and the sunshade is in a closed position, the latter may be turned down, remaining in the non using position, as may be seen in FIG. 8; to open the sunshade, same is turned upwards, the cover (C) is lowered, if same should have been foreseen, and then the movement of the cloth (B) is forced down, as shown in FIG. 9, whilst the stems (21) which support the cloth (B) gyrate round the ring (20) and lodge in the slots (18') of the washers (18); once the sunshade has been opened (FIG. 10), it is possible to make it slide along the entire rod (1), thanks to the hollowed out head (14) of the pin (12), permitting that the user chooses the position which best protects from the sun; once the position has been chosen, the user screws the button (24) on the pin (12); its tightening pressurizes the spacer sleeve (15) against the rod (1), now preventing the moving of the pin head (14), and consequently, of the sunshade on the rod (1), thus locking it in the chosen position (see FIG. 5).

Additionally, the rod (1) may be inclined more to the front or more backward, depending on the position of the sun; to obtain this, the user unscrews slightly the crank (6), which causes that the teeth (10') of protuberances (10) foreseen on parts (4) and (7) are slightly separated, thus permitting the user to choose a certain inclination of the rod (1), locking it again by tightening the crank (6) (see FIGS. 2 and 3).

I claim:
1. SUNSHADE-HOLDER FOR DECK CHAIRS AND BABY CARRIAGES, whereas it consists of a rod (1) "U" folded, with smoothly rounded up edges (1,), fastened to the tubular structure (A) of the deck chair or baby carriage, by means of two devices (2) fastened at their free ends, made up by a central part (3), equipped with lower cylindrical body (4), pierced through by a horizontal pin (5), fastener, on the one side, of a crank (6) and on the other side, of two equal and symmetrical parts (7) and (8), having a "C" like shape, which limit between them a space (9) through which they are fixed on the tubular structure (A) of the chair or baby carriage, while both the part (7) as the body (4) are equipped with a short cylindrical side protuberance (10), one turned in the direction to the other, their confronting faces having teeth (10') which are capable to couple one into another; slidingly on the rod (1), a device is assembled, consisting of a substantially long pin (12), having a threaded section (13), the cylindrical head (14) of which has a through-hole, through which passes the rod (1), and around the mentioned pin (12) a tubular and cylindrical spacer sleeve (15) is assembled with its end, which is dished, turned to the rod (1), and which is capable to make pressure on the mentioned rod; an assembly of parts, duly secured one to the other by rivet (17), rests on the mentioned sleeve, also assembled round the pin (12); said parts are formed by two washers (18) with radial slits (18') and between them is foreseen a flat ring (19) and one circular section ring (20), support for the stems (21), holders of the sunshade cloth (B) and which coincide with the slits (18') of the washers (18), being further completed by a lower support washer (22); constituting an element which fastens the sunshade to the rod (1), a button (24) is foreseen, screwable on the threaded section (13) of the pin (12), which, if turned in the direction of the rod (1), causes the tightening of all components against the sleeve (15) and the tightening of the latter against the rod (1).

2. SUNSHADE-HOLDER FOR DECK CHAIR AND BABY CARRIAGES, in accordance with claim 1, whereas, optionally, between the sleeve (15) and the assembly of parts fastened by the rivet (17),a washer (23) is foreseen which holds a plastic cover (C) for the protection of the sunshade cloth.

* * * * *